(12) United States Patent
Butter et al.

(10) Patent No.: US 8,381,588 B2
(45) Date of Patent: Feb. 26, 2013

(54) STORAGE APPARATUS FOR A MEASUREMENT PROBE

(75) Inventors: Andrew Geoffrey Butter, Wotton-under-Edge (GB); David Adams, Cheltenham (GB)

(73) Assignee: Renishaw PLC, Wotton-under-Edge (GB)

( * ) Notice: Subject to any disclaimer, the term of this patent is extended or adjusted under 35 U.S.C. 154(b) by 489 days.

(21) Appl. No.: 12/450,898

(22) PCT Filed: Apr. 30, 2008

(86) PCT No.: PCT/GB2008/001519
§ 371 (c)(1),
(2), (4) Date: Oct. 16, 2009

(87) PCT Pub. No.: WO2008/132490
PCT Pub. Date: Nov. 6, 2008

(65) Prior Publication Data
US 2010/0206068 A1  Aug. 19, 2010

(30) Foreign Application Priority Data
Apr. 30, 2007 (GB) .................................... 0708319.9

(51) Int. Cl.
*G01D 11/24* (2006.01)
(52) U.S. Cl. ........................................................ 73/431
(58) Field of Classification Search ...................... 73/431
See application file for complete search history.

(56) References Cited

U.S. PATENT DOCUMENTS

| 2,330,168 | A | | 8/1941 | Zimmermann |
| 4,428,055 | A | | 1/1984 | Kelley et al. |
| 4,750,835 | A | | 6/1988 | McMurtry |
| 4,979,284 | A | | 12/1990 | McMurtry et al. |
| 5,001,842 | A | | 3/1991 | Wright et al. |
| 5,028,901 | A | | 7/1991 | Enderle et al. |
| 5,101,548 | A | * | 4/1992 | McMurtry et al. ............... 483/62 |
| 5,179,786 | A | | 1/1993 | Shelton |
| 5,247,751 | A | | 9/1993 | Ohya et al. |
| 5,270,664 | A | | 12/1993 | McMurtry et al. |
| 5,327,657 | A | * | 7/1994 | Hajdukiewicz et al. ........ 33/503 |

(Continued)

FOREIGN PATENT DOCUMENTS

| DE | 42 11 813 C1 | 6/1993 |
| DE | 44 36 782 A1 | 4/1995 |

(Continued)

OTHER PUBLICATIONS

Harb et al.; "Resonator-based touch-sensitive probe;" *Sensors and Actuators A*; 1995; pp. 23-29; vol. 50.

(Continued)

*Primary Examiner* — Lisa Caputo
*Assistant Examiner* — Jamel Williams
(74) *Attorney, Agent, or Firm* — Oliff & Berridge, PLC

(57) ABSTRACT

The disclosure relates to a storage apparatus for a measurement probe for use with a coordinate positioning machine. The storage apparatus has at least one receptacle for a measurement probe. At least one receptacle connector is provided for electrical connection with at least one probe connector on a measurement probe located in the receptacle. The one receptacle connector is configured such that it can be displaced so as to disconnect it from the probe connector of a measurement probe located in the receptacle.

15 Claims, 6 Drawing Sheets

U.S. PATENT DOCUMENTS

| | | | |
|---|---|---|---|
| 5,339,956 A | | 8/1994 | Thomason |
| 5,393,288 A | * | 2/1995 | Miyasaka et al. ............ 483/1 |
| 5,517,190 A | | 5/1996 | Gunn |
| 5,646,049 A | * | 7/1997 | Tayi ........................ 436/518 |
| 5,675,902 A | | 10/1997 | Chase |
| 5,949,257 A | | 9/1999 | Ishikawa |
| 6,012,230 A | | 1/2000 | McMurtry et al. |
| 6,708,420 B1 | | 3/2004 | Flanagan |
| 6,772,527 B1 | * | 8/2004 | Butter et al. ................ 33/503 |
| 7,041,963 B2 | | 5/2006 | El Rifai et al. |
| 7,096,077 B2 | * | 8/2006 | Price et al. ................. 700/66 |
| 7,722,515 B2 | * | 5/2010 | McMurty et al. ........... 483/59 |
| 7,861,430 B2 | | 1/2011 | Jonas et al. |
| 2003/0210235 A1 | | 11/2003 | Roberts |
| 2004/0184039 A1 | | 9/2004 | Christoph |
| 2004/0266595 A1 | | 12/2004 | Rosch |
| 2006/0129349 A1 | | 6/2006 | Raab et al. |
| 2006/0253206 A1 | * | 11/2006 | Price et al. ................. 700/66 |
| 2010/0122920 A1 | * | 5/2010 | Butter et al. ............... 206/223 |
| 2010/0132207 A1 | | 6/2010 | Mamour et al. |
| 2010/0206068 A1 | | 8/2010 | Butter et al. |
| 2011/0061253 A1 | | 3/2011 | Jonas et al. |

FOREIGN PATENT DOCUMENTS

| | | |
|---|---|---|
| DE | 44 42 247 A1 | 5/1996 |
| EP | 0 406 781 A2 | 1/1991 |
| EP | 0 690 286 A1 | 1/1996 |
| EP | 0 856 377 A1 | 8/1998 |
| GB | 2 006 435 A | 5/1979 |
| GB | 2 070 249 A | 9/1981 |
| GB | 2 295 565 A | 6/1996 |
| GB | 2 348 706 A | 10/2000 |
| GB | 2 407 718 A | 5/2005 |
| JP | A-61-047502 | 3/1986 |
| JP | A-02-152769 | 6/1990 |
| JP | A-07-167638 | 7/1995 |
| JP | A-09-285965 | 11/1997 |
| WO | WO 89/07745 A1 | 8/1989 |
| WO | WO 90/07097 A1 | 6/1990 |
| WO | WO 00/60310 A1 | 10/2000 |
| WO | WO 03/002296 A1 | 1/2003 |
| WO | WO 03/051575 A1 | 6/2003 |
| WO | WO 03/053630 A1 | 7/2003 |
| WO | WO 03/089188 A1 | 10/2003 |
| WO | WO 2004/007143 A1 | 1/2004 |
| WO | WO 2007/093789 A1 | 8/2007 |
| WO | WO 2007/129071 A1 | 11/2007 |
| WO | WO 2007/129082 A1 | 11/2007 |
| WO | WO 2008/132484 A1 | 11/2008 |

OTHER PUBLICATIONS

International Search Report issued in International Application No. PCT/GB2008/001508; Mailed on Sep. 15, 2008.

British Search Report issued in Great Britain Application No. 0708319.9; Feb. 15, 2008.

British Search Report issued in Great Britain Application No. 0708319.9; Aug. 20, 2007.

British Search Report issued in Great Britain Application No. 0715799.3; Dec. 11, 2007.

International Search Report issued in International Application No. PCT/GB2007/001667; Mailed on Jan. 8, 2008.

U.S. Appl. No. 12/226,731, filed Oct. 27, 2008 in the name of Weston et al.

U.S. Appl. No. 12/450,983, filed Oct. 21, 2009 in the name of Butter et al.

U.S. Appl. No. 12/450,898, filed Oct. 21, 2009 in the name of Butter et al.

Oct. 5, 2010 Notice of Allowance and Fee(s) Due issued in U.S. Appl. No. 12/226,731.

Mar. 15, 2012 Office Action issued in U.S. Appl. No. 12/450,982.

Oct. 23, 2012 Office Action issued in U.S. Appl. No. 12/450,983.

* cited by examiner

STORAGE APPARATUS FOR A MEASUREMENT PROBE

This invention relates to a storage apparatus for a measurement probe for use with a coordinate positioning machine, and also to a method for storing a measurement probe.

Measurement probes can be used by coordinate positioning machines for a number of different measurement applications. Example measurement probes include contact and non-contact measurement probes. It is known to provide a plurality of interchangeable measurement probes for use with the same coordinate positioning machine. The measurement probes have a contact face which presents features for mounting to a corresponding contact face of a quill or head on the coordinate positioning apparatus.

Measurement probes can contain electrical components, such as components for performing measurement, e.g. lasers in optical analogue scanning probes, or for example storing data about the measurement probe.

It is also known to provide a rack for storing measurement probes which are not in use by the coordinate positioning machine. The rack can be stored within the coordinate positioning machine's working area so that it is possible for the coordinate positioning machine to automatically load and unload measurement probes from and to the rack.

A known rack comprises a number of receptacles each having a pair of floating pins which provide electrical connection to a laser within an analogue scanning measurement probe located in a receptacle, via a corresponding pair of contacts on the side of the probe body. The probe body has a set of electrical connectors separate to the pair of contacts via which power is supplied to the probe when in use on a coordinate positioning machine. This separate set is provided on a different region of the measurement probe. In particular, the separate set is provided on the probe body's contact face (i.e.—the face which is for engagement with the head of a coordinate positioning machine) as opposed to the side of the probe body. The rack is configured such that when a probe is located in the receptacle, power can be supplied to a laser in the probe via the pair of contacts on the probe body's side in order to keep the laser turned on. This avoids the need to wait for the laser to warm up when the probe is loaded onto a coordinate positioning machine. The pin connectors are provided at the back of the receptacle. Connection between the pin connectors and the pair of contacts on the side of the probe body is formed by pushing the probe into the receptacle. The pin connectors and contacts on the side of the probe body can be disconnected by pulling the probe away from the pin connectors and out of the receptacle.

According to a first aspect of the invention, there is provided a storage apparatus for a measurement probe for use with a coordinate positioning machine, comprising: at least one receptacle for a measurement probe; at least one receptacle connector for electrical connection with at least one probe connector on a measurement probe located in the receptacle, in which the at least one receptacle connector is configured such that it can be displaced so as to disconnect it from the probe connector of a measurement probe located in the receptacle.

The invention provides for automatic loading and unloading of a measurement probe in the storage apparatus, for example via a coordinate positioning machine, whilst also enabling the at least one receptacle connector to connect to a connectors on the probe that cannot be accessed whilst the probe is mounted on a coordinate positioning machine.

The at least one receptacle connector could be configured such that it can be displaced by an external device acting directly on the at least one receptacle, connector. For example at least one receptacle connector could be configured such that it can be moved by the head of a coordinate positioning machine acting directly on the at least one connector.

Optionally, the storage apparatus could comprise a displacement member operable by a coordinate positioning machine so as to displace the at least one receptacle connector. The displacement member could comprise a motor or other actuator which can be activated so as to cause the at least one receptacle connector to be displaced. A sensor, button or other device could be provided which can be activated by an external device, for example a coordinate positioning machine, so as to cause the displacement member to actively displace the at least one receptacle connector. For example a photodetector could be provided for detecting when the head of a coordinate positioning machine is in the vicinity of the receptacle and activate the actuator to cause displacement of the at least one receptacle connector. Optionally, a button, or other mechanical switch could be provided which can be operated by a part of a coordinate positioning machine, such as its head or quill, so as to actuate the actuator to cause displacement of the at least one receptacle connector.

As will be understood, the receptacle is the part of the storage unit which can receive a measurement probe for storage. The receptacle could be configured to receive a single measurement probe only. The receptacle can be defined by features which can support a measurement probe located in the receptacle. The receptacle could comprise features for engagement with corresponding engagement features on a measurement probe. For instance the receptacle could comprise at least one projection for engagement with a corresponding groove on a measurement probe. Optionally, the receptacle could comprise at least one recess for engagement with a corresponding projection on a measurement probe.

The displacement member need not comprise an active member such as a motor. For instance, the displacement member could be configured such that it can be displaced by an external device acting on it. For instance, the displacement member could comprise a part for contact by an external device such that the external device can act on the displacement member so as to forcibly displace it and in turn the at least one receptacle connector. As will be understood, the external device could be a part of a coordinate positioning machine such as its head or quill.

The displacement member can comprise an arm on which the at least one receptacle connector is carried. Preferably at least a part of the arm extends from the storage unit for manipulation by a part of coordinate positioning machine, for example its head or quill. Accordingly, the arm and hence at least one receptacle connector can be displaced by an external device exerting a force on the arm.

Preferably at least a part of the arm extends across the receptacle. Accordingly the arm could be configured such that when a measurement probe is located in the receptacle the arm extends over at least a part of the face of a measurement probe which is for mounting to a coordinate positioning machine, for instance to the head or quill of a coordinate positioning machine. This face is often referred to in the industry as the probe's "contact face". Accordingly the arm can be configured to cover at least a part of the contact face of a measurement probe located in the receptacle.

Preferably, the at least one arm is displaceable relative to the receptacle so as to be able to expose the contact face of a measurement probe located in the receptacle. This is advantageous as it can increase the ease of automatic locating and removal of measurement probes within the receptacle by the quill or head of a coordinate positioning apparatus.

The arm could be hinged such that it can pivot relative to the receptacle. Optionally, the arm could be slidingly mounted such that the arm can be slid relative to the receptacle.

Preferably, the at least one arm is displaceable between an open position in which the contact face of a measurement probe located in the receptacle is exposed and a closed position in which arm the contact face of a measurement at least partially covers the contact face. Preferably the arm is biased toward the closed position.

Preferably, the arm is configured to cover at least 50% of the contact face of a measurement probe located in the receptacle, more preferably at least 75%, especially preferably at least 100%. In these cases the arm can act as a protective cover as well carrying the at least one connector.

Measurement probes typically have connectors on their contact face. These connectors are configured to connect with corresponding connectors on the quill or head of a coordinate positioning machine. The at least one connector can be provided on the part of the arm which extends over the contact face. Accordingly, the at least one receptacle connector can be configured for electrical connection to any electrical components in a measurement probe located in the receptacle via an probe connector on the measurement probe's contact face. Providing the at least one receptacle connector such that it can connect to electrical connector's on the measurement probe's contact face is advantageous as it avoids the needs to provide connectors on other parts of the measurement probe. That is; all the connectors can be located on the contact face. Furthermore, it can enable the storage apparatus to connect to the electrical components within the measurement probe via the same electrical connectors that the coordinate positioning machine connects to the electrical components. Accordingly, it can minimise the number of contacts needed to be provided on a measurement probe.

Accordingly, preferably the at least one storage apparatus is configured such that when a measurement probe is located in the receptacle the at least one receptacle connector opposes the contact face of a measurement probe. More preferably the at least one storage apparatus is configured such that when a measurement probe is located in the receptacle the at least one receptacle connector is configured to connect to a measurement probe coordinate positioning machine connector. That is, when a measurement probe is located in the receptacle preferably the at least one receptacle connector electrically connects to at least one connector on the measurement probe which is electrically connected to a corresponding connector on a coordinate positioning machine when the measurement probe is mounted on a coordinate positioning machine. As discussed in more detail below, the connector on the measurement probe could be one that is used to supply power to the measurement probe or used to transfer data between the measurement probe and the coordinate positioning machine when it is mounted on the coordinate positioning machine.

As will be understood, the at least one receptacle connector need not be a contact connector. For instance, the at least one receptacle connector could be an inductive connector. In this case, the storage unit could be configured such that the storage unit is configured to not engage any part of a contact face of a measurement probe located in the receptacle. Preferably, the receptacle connector is a contact connector. That is preferably the receptacle connector is a conductive connector. Preferably the at least one receptacle connector is configured to engage a probe connector located in the receptacle.

The at least one receptacle connector could be rigidly mounted to the arm. Preferably, the at least one receptacle connector is mounted on the arm via a flexible mount. Preferably the flexible mount is a resiliently flexible mount. This can enable the at least one receptacle connector to move relative to the at least one arm in at least one dimension. This provides for compliance so as to accommodate variations in the position and size of measurement probes and their probe connectors and provide for good electrical connection. This is especially preferred when the receptacle connector is a contact connector. Accordingly, it can be preferred that the at least one receptacle connector is a floating connector, especially a resiliently floating connector. This can help improve the contact between the at least one connector and the connectors on the contact face of a measurement probe located in the receptacle.

Preferably, the at least one arm is configured to be biased against the measurement probe located in the receptacle. Accordingly, the storage unit can comprise a biasing member. The biasing member could be for instance, a spring configured to urge the contact face against the measurement probe located in the receptacle. Preferably, the at least one arm comprises at least one magnet for attracting a measurement probe located in the receptacle. Preferably, the at least one arm is configured to be biased against the measurement probe's contact face.

Preferably, the storage unit comprises at least one location feature for cooperation with a corresponding feature on a measurement probe located in the receptacle. Preferably, the arm comprises the at least one location feature. For instance, the at least one arm could comprise at least one of a recess or projection for engagement with a corresponding projection or recess on a measurement probe located in the receptacle. This can help aid alignment of a measurement probe in a receptacle relative to the arm so as the ensure a good electrical connection between the at least one receptacle connector and that on the measurement probe.

The at least one receptacle connector can be for supplying electric power to any electrical components in a measurement probe received in the receptacle. Accordingly, the at least one connector can be a power supply connector. Measurement probes can have at least one electrical power supply connector which connects with a corresponding electrical power supply connectors on the coordinate positioning machine in order to supply power to the electronic components from the coordinate positioning machine's power supply. Preferably, the storage apparatus is configured such that the receptacle's at least one power supply connector can connect with a measurement probe's at least one coordinate positioning machine power supply connector when the measurement probe is located in the receptacle. This is advantageous as it avoids the need to provide different connectors on the measurement probe for receiving power from the coordinate positioning machine and from the storage unit.

As will be understood, the storage apparatus could comprise a power source for supplying the electrical power. Optionally, the power could be supplied by an external power source connected to the storage apparatus' at least one receptacle connector. The electrical power could be supplied in order to keep an electrical component in the measurement probe turned on. The electrical power could be supplied in order to keep an electrical component warm. The electrical component could be a part of the measurement probe which is used in the performance of measurement using the probe. For instance, the electrical component could be a laser or for example a photodiode used to track deflection of the probe's stylus. Optionally, the electrical component could be a signal processing component. Further optionally, the electrical component could be a part of the measurement probe used to control the temperature of the measurement probe. For instance the electrical component could be heat source, such as a resistor.

The at least one receptacle connector could be for transferring data to and from any electrical components in a measurement probe located in the receptacle. Accordingly, the at least one receptacle connector could be a data connector. Measurement probes can have electrical data connectors which connect with corresponding electrical data connectors on the coordinate positioning machine in order to send data between the tool and the coordinate positioning machine. Preferably, the storage apparatus is configured such that the receptacle's at least one data connector can connect with a measurement probe's at least one coordinate positioning machine data connector when the measurement probe is located in the receptacle. As will be understood, the storage apparatus could comprise a processor device for communicating with the electrical components in a measurement probe located in the receptacle via the at least one receptacle connector. Optionally, a processor device could be provided separate to the storage apparatus and could be connected to electrical components in the measurement probe via the storage apparatus' at least one receptacle connector.

The storage apparatus can comprise at least two receptacles, at least one of which has at least one receptacle connector which can be displaced so as to disconnect it from a probe connector of a measurement probe located in the receptacle. The storage apparatus can comprise at least two receptacles, at least two of which each have at least one receptacle connector which can be displaced so as to disconnect it from a probe connector of a measurement probe located in the receptacle. As will be understood, the storage apparatus could comprise a plurality of receptacles, some of which comprise receptacle connectors for connecting in the manner of the present invention, and others which have receptacle connectors configured so as to be displaceable in the manner of the invention, or even which have no receptacle connectors.

According to a second aspect of the invention there is provided a kit comprising: a storage apparatus having a receptacle for a measurement probe and at least one receptacle connector; a measurement probe for use on a coordinate positioning machine, the measurement probe having a contact face providing at least one machine connector for electrical connection to a corresponding connector on a coordinate positioning machine when mounted on a coordinate positioning machine; in which the storage apparatus is configured such that the at least one receptacle connector is configured to electrically connect to an electrical connector on the measurement probe's contact face when the measurement probe is located in the receptacle.

The electrical connector on the measurement probe's contact face need not be the probe's machine connector. Accordingly the measurement probe could connect to the storage apparatus via a connector which is different to that via which it connects to the coordinate positioning apparatus. Preferably, the storage apparatus is configured such that the at least one receptacle connector electrically connects with contact face's at least one machine connector. Accordingly preferably, the measurement probe does connect to the storage apparatus via a connector which it also connects to the coordinate positioning apparatus.

According to a third aspect of the invention there is provided a method of storing a measurement probe mounted on a coordinate positioning machine in a storage apparatus, the measurement probe comprising electrical components that are electrically connected to the coordinate position machine via at least one machine connector provided on a contact face of the measurement probe, the storage apparatus comprising at least one receptacle and at least one receptacle connector, the method comprising in any suitable order: locating the measurement probe in the receptacle; and electrically connecting the at least one receptacle connector to the electrical components in the measurement probe via an electrical connector on the measurement probe's contact face.

The electrical connector on the measurement probe's contact face need not be the probe's machine connector. Accordingly the measurement probe could connect to the storage apparatus via a connector which is different to that via which it connects to the coordinate positioning apparatus. Preferably the method comprises electrically connecting the at least one receptacle connector to the electrical components in the measurement probe via the measurement probe's machine connector. Accordingly preferably, the measurement probe does connect to the storage apparatus via a connector which it also connects to the coordinate positioning apparatus.

According to a fourth aspect of the invention there is provided a storage apparatus for a tool for use with a coordinate positioning machine, comprising: a storage unit having at least one receptacle for a tool; at least one connector for electrically connecting to any electrical components in a tool received in the receptacle via the tool's at least one coordinate positioning machine electrical connector.

The at least one connector could be used to transfer data between a processor in the storage unit and the tool. Optionally, the at least one connector is for supplying electric power to any electrical components in a tool received in the receptacle via the tool's at least one coordinate positioning machine power supply connector.

The storage unit could comprise at least one arm configured to extend over at least a part of the contact face of a tool received in the at least one receptacle. The arm could carry the at least one electrical connector. Preferably the arm extends over the entire contact face of a tool received in the at least one receptacle. The contact face of a tool is its face which is for engagement with a coordinate positioning machine. The arm could be used as a cover to protect at least a part of the contact face.

Preferably, the arm is displaceable relative to the receptacle so as to be able to expose the contact face of a tool received in the receptacle. This is advantageous as it enables easy access to the receptacle during loading and unloading of a coordinate measuring machine.

Preferably the at least one electrical connector is mounted on the arm via a flexible mount such that the at least one electrical connector can move relative to the arm. This can improve the contact between the storage unit's at least one electrical connector and the electrical connector on a tool.

As will be understood, the above mentioned features in connection with the first aspect of the invention are suitable for use with the second, third and fourth aspects of the invention.

An embodiment of the invention will now be described, by way of example, and with reference to the following drawings, in which.

Figure 1:
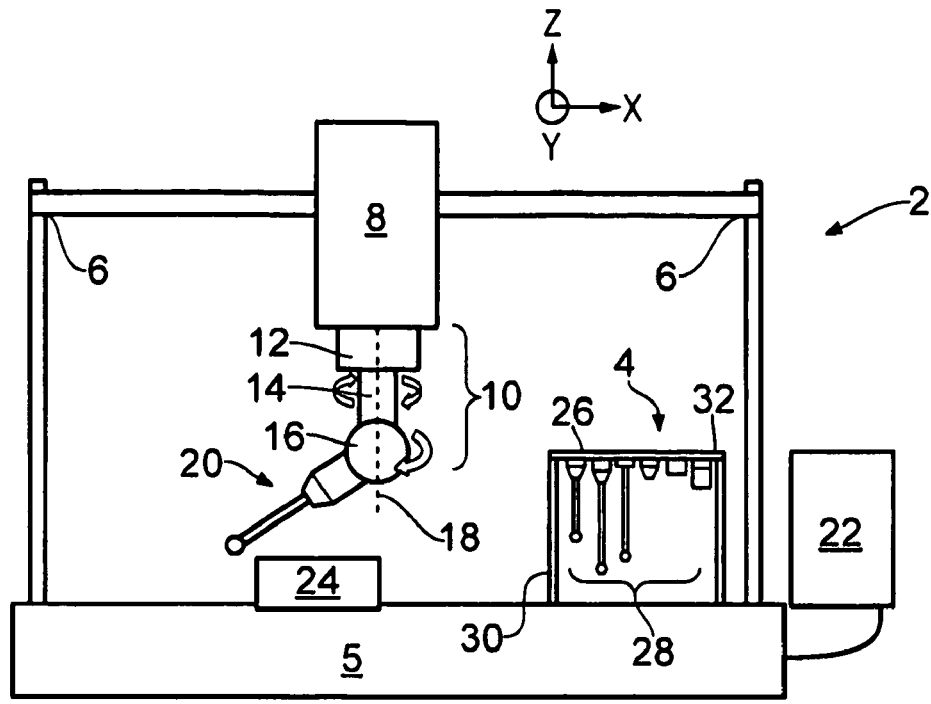
FIG. 1 shows a storage apparatus according to the present invention located for use with a coordinate measuring machine.

Referring to FIG. 1, a coordinate measuring machine (CMM) 2 in which a storage apparatus 4 according to the present invention is located is shown. The CMM 2 will be described for purposes of background information only. As will be understood, the CMM 2 does not form a part of the present invention.

The CMM 2 comprises a base 5, supporting a frame 6 which in turn holds a quill 8. Motors (not shown) are provided to move the quill 8 along the three mutually orthogonal axes X, Y and Z. The quill 8 holds an articulating head 10. The head 10 has a base portion 12 attached to the quill 8, an intermediate portion 14 and a probe retaining portion 16. The base portion 12 comprises a first motor (not shown) for rotating the intermediate portion 14 about a first rotational axis 18. The intermediate portion 14 comprises a second motor (not shown) for rotating the probe retaining portion 16 about a second rotational axis that is substantially perpendicular to the first rotational axis. Although not shown, bearings may also be provided between the moveable parts of the articulating head probe.

A measurement probe 20 is removably attached (e.g. using a kinematic mount) to the probe retaining portion 16. The measurement probe 20 can be held by the probe retaining portion 16 by the use of corresponding magnets (not shown) provided on or in the measurement probe 20 and probe retaining portion 16. The measurement probe 20 may be a touch trigger probe or an analogue probe including a stylus. The probe may comprise an optical sensor. Alternatively, the probe may be a non-contacting probe such as an optical, probe.

A machine controller 22 for controlling the operation of the CMM 2 is also provided. The machine controller 22 may be a dedicated electronic control system and/or may comprise a personal computer.

The head 10 allows the measurement probe 20 to be moved with two degrees of freedom relative to the quill 8. The combination of the two degrees of freedom provided by the head 10 and the three linear (X, Y, Z) axes of translation of the CMM allows the measurement'probe 12 to be moved about five axes. This permits so called "five-axis" measurements of an associated part 24 mounted to the base portion 5 of the machine.

The storage apparatus 4 comprises a storage unit 26 having a plurality of receptacles for receiving a plurality of different types of measurement probes, styli and modules 28.

Figure 2:
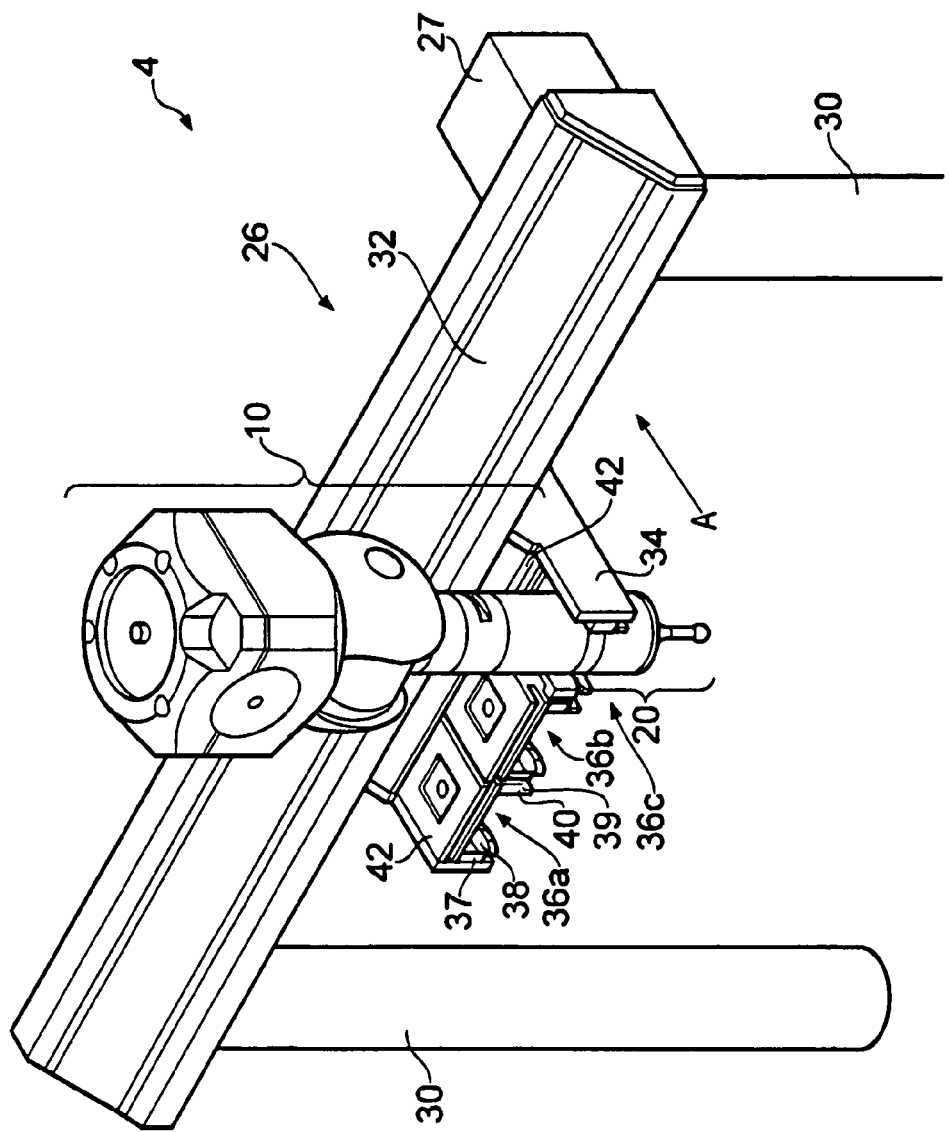
FIG. 2 is a perspective view of a first embodiment of a storage apparatus according to the present invention.
Figure 3:
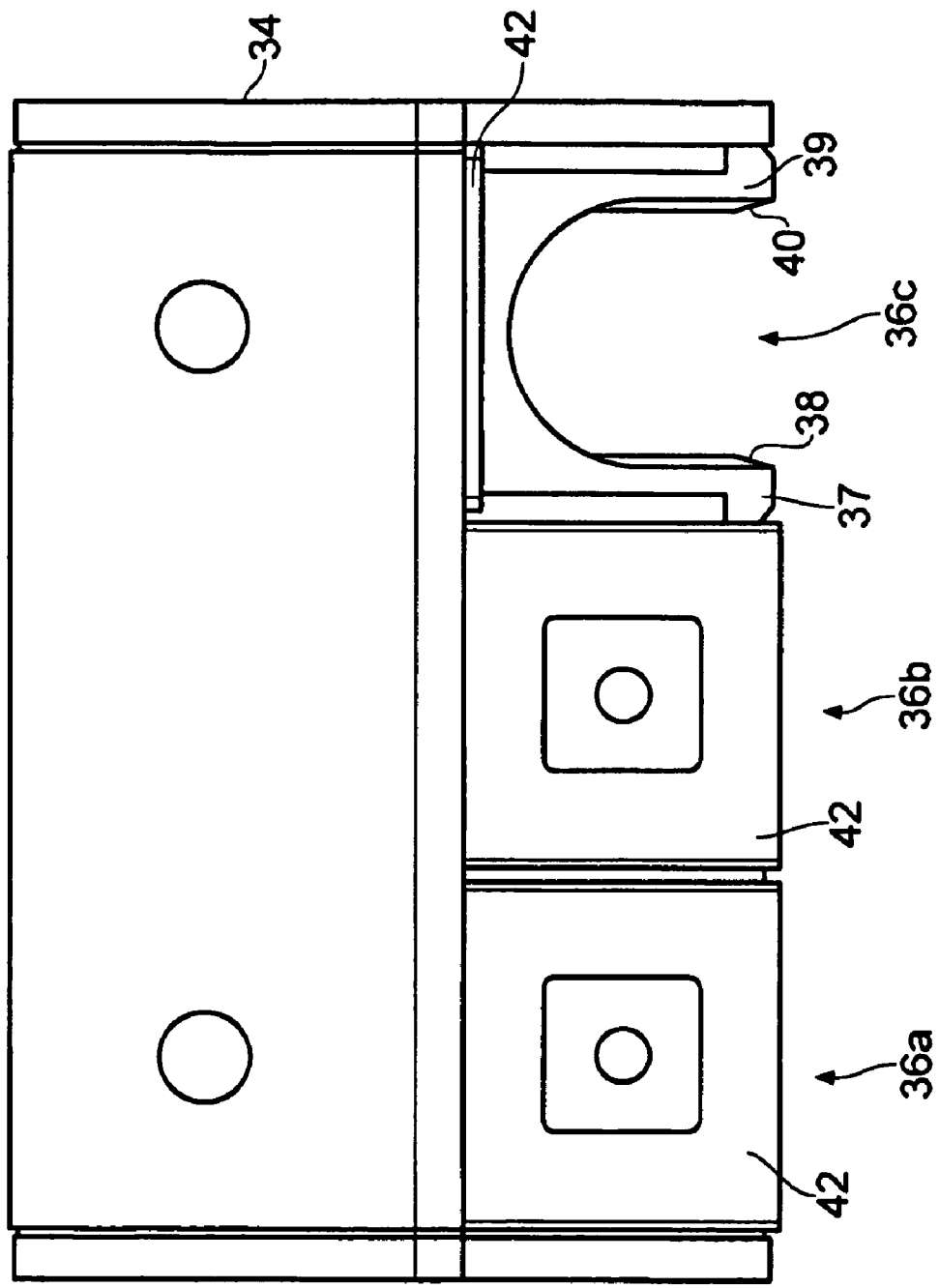
FIG. 3 is a plan view of the receptacle housing of the storage apparatus shown in FIG. 2.
Figure 4:
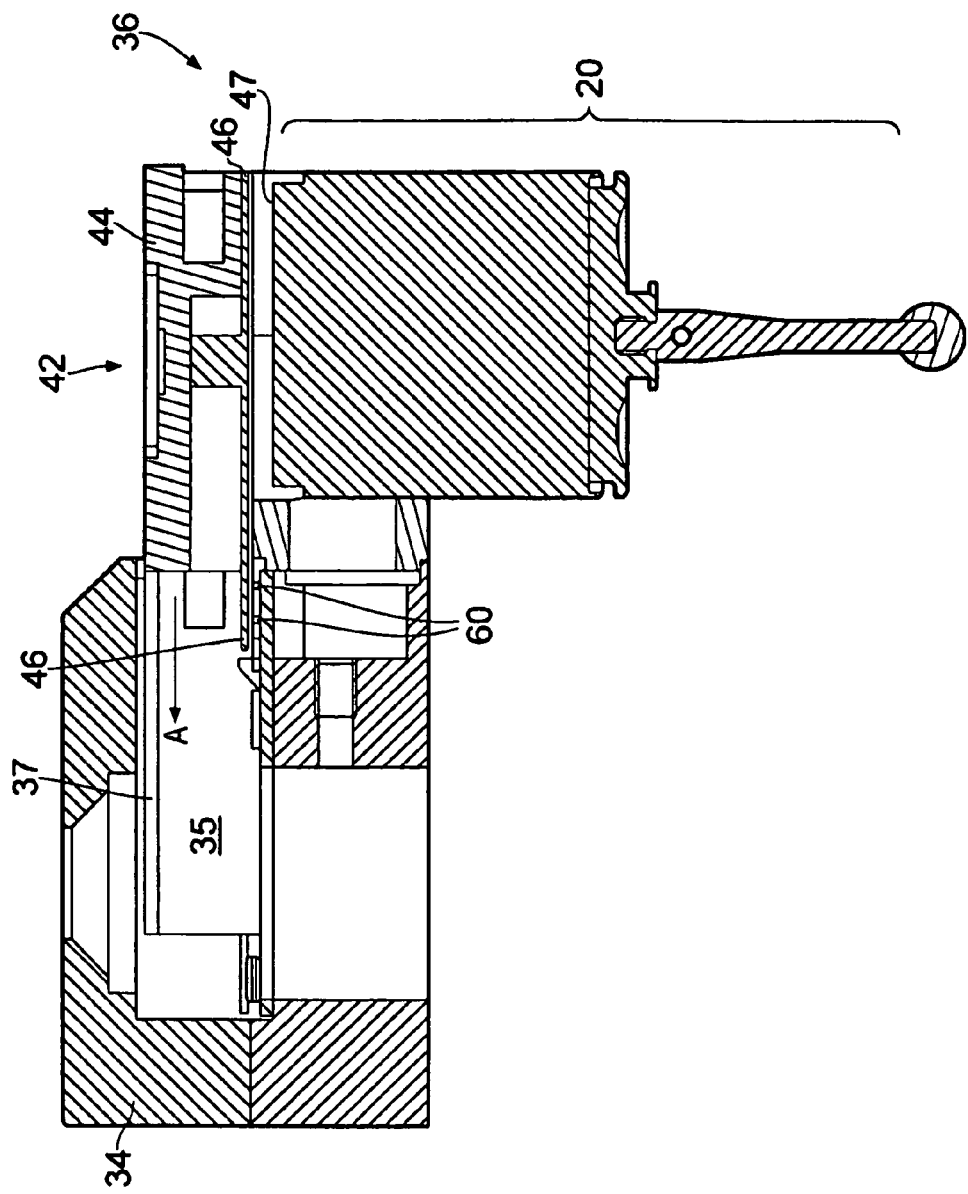
FIG. 4 is a cross-sectional view of a receptacle and the receptacle housing shown in FIGS. 2 and 3.

With reference to FIGS. 2 to 4, there is shown a storage apparatus 4 comprising a storage unit 26 and a temperature control device 27. Although shown as a unit attached to the rack 32, the temperature control device 27 could be provided separately to the storage unit 26, or could, for instance, be located within the receptacle housing 34. The storage unit 26 comprises upright supports 30 mounted to the base 5 of the CMM 2 and a rack 32 supporting a receptacle housing 34 which has a plurality of receptacles 36a, 36b, 36c for receiving metrological devices such as measurement probes, styli, modules and tool bits.

Each receptacle 36 comprises first 37 and second 39 side walls defining first 38 and second 40 directly opposing ribs for cooperation with corresponding grooves on a metrological device, such as the measurement probe 20, to be received in the receptacle. The first 38 and second 40 ribs are provided so as to guide the measurement probe into the receptacle 36. The first 38 and second 40 ribs, and the corresponding grooves on a device to be received in the receptacle are also shaped and sized such that the measurement probe 20 can be received in one orientation only.

Each receptacle 36 also comprises a protective cover 42 extending between the first 37 and second 39 side walls. Each protective cover 42 is biased into the closed position (as illustrated by the covers for receptacles 36a and 36b shown in FIGS. 2 and 3) but can be pushed into a void 35 in the receptacle housing 34 in the direction illustrated by arrow A. This enables the measurement probe 20 to be slid into the receptacle 36 via the head 10 which is holding the measurement probe 20 from the measurement probe's 20 upper face (as illustrated by the cover for receptacle 36c shown in FIGS. 2 and 3).

Referring to FIG. 4 there is shown a cross-sectional view of one of the receptacles 36. The receptacle 36 includes a protective cover 42 which comprises an outer shell 44 made of a plastics material such as a PTFE impregnated thermo plastic, and a heat transfer plate 46 made of a metallic material such as aluminium. As shown, the receptacle 36 and protective cover 42 are configured such that when a measuring probe 20 is received in the receptacle 36, the measuring probe 20 will be spaced apart from the heat transfer plate 46.

The protective cover 42 is mounted so that it can slide, along rails 37, into the receptacle housing 34 in the direction illustrated by arrow A. A bias mechanism (not shown) biases the protective cover 42 towards the closed position shown in FIG. 4.

The receptacle 36 further includes a heat source in the form of a heating element 60, for example a resistor, which is mounted on the receptacle housing 34. The heating element 60 is electrically connected to the temperature control device 27 via wires (not shown). The heating element 60 and the heat transfer plate 46 are configured such that the heating element 60 heats the heat transfer plate 46. The heat transfer plate 46 in turn heats the measuring probe 20 received in the receptacle 36 from the measuring probe's 20 contact face 47 downwards. The heating element 60 is spaced a small distance away from the heat transfer plate 46 so that it does not interfere with the displacement of the protective cover 42 during use.

Figure 5:
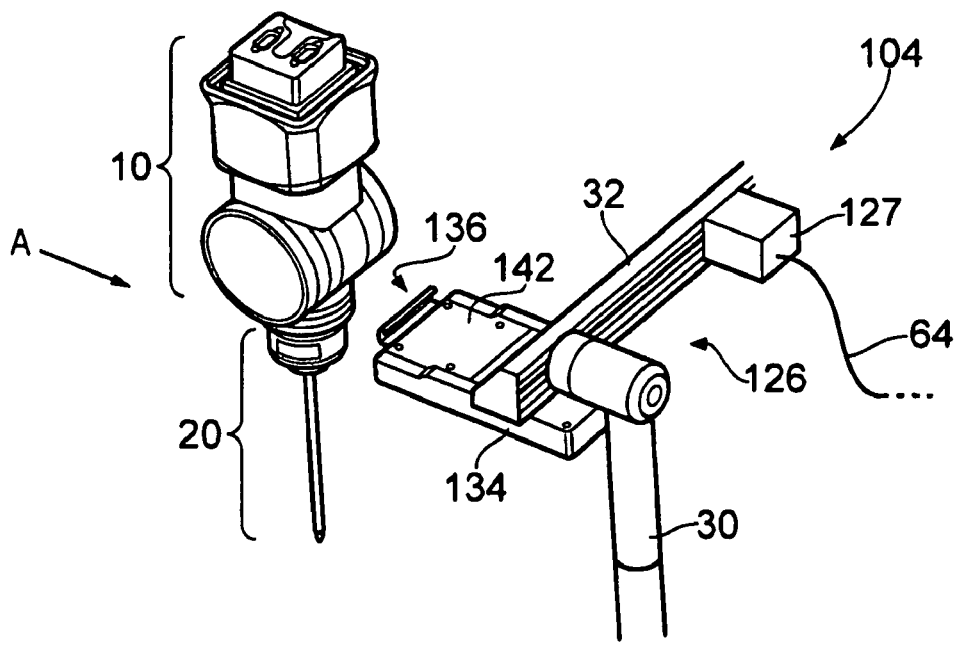
FIG. 5 is a perspective view of a second embodiment of a storage apparatus according to the present invention.
Figure 7:
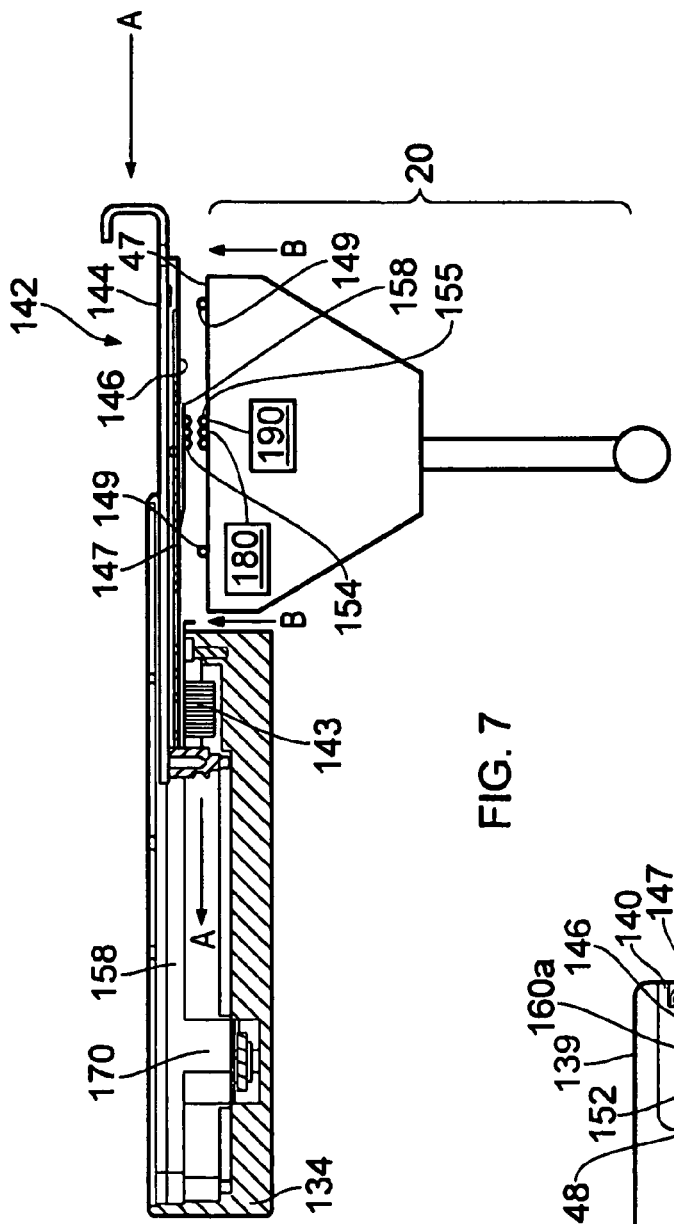
FIG. 7 is a cross-sectional view of the receptacle housing shown in FIG. 6.
Figure 6:
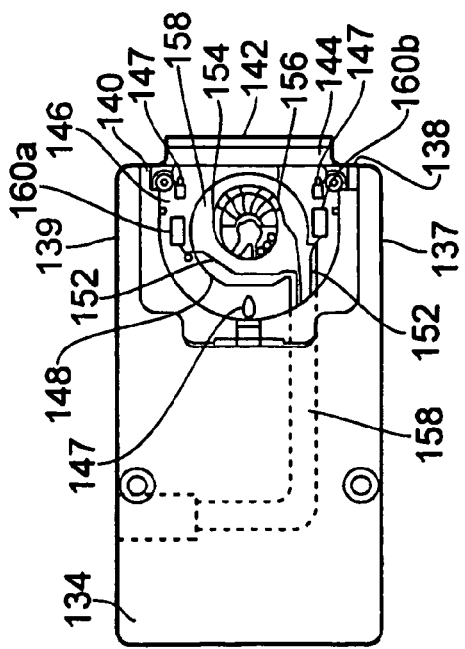
FIG. 6 is a plan, underside view of a receptacle housing of the storage apparatus shown in FIG. 5.

With reference to FIGS. 5 to 7, there is shown a storage apparatus 104 according to the present invention. The storage apparatus 104 illustrated in FIGS. 5 to 7 is similar to the storage apparatus 4 illustrated in FIGS. 2 to 4, and like parts share like reference numerals.

The storage apparatus 104 comprises a storage unit 126 and a control unit 127. The storage unit 126 comprises upright supports 30 mounted to the base 5 of the CMM 2 and a rack 32 supporting a receptacle housing 134. The receptacle housing 134 has a single receptacle 136 for receiving a metrological device such as a measurement probe, stylus, module or a tool bit. As will be understood, a plurality of receptacle housings 134 could be provided along the rack 32 such that a plurality of metrological devices can be stored in the storage unit 126. However, for the sake of simplicity and illustration only a single receptacle housing 134 is shown and described.

The receptacle 136 comprises first 137 and second 139 side walls defining first 138 and second 140 directly opposing ribs for cooperation with corresponding grooves on a metrological device, such as the measurement probe 20, to be received in the receptacle.

The receptacle 136 also comprises a protective cover 142 extending between the first 137 and second 139 side walls. The protective cover 142 is biased into the closed position by a spring 143 but can be pushed into the receptacle housing 134 in the direction illustrated by arrow A. This enables the measurement probe 20 to be slid into the receptacle 136 via the head 10 which is holding the measurement probe 20 from the measurement probe's 20 contact face.

Referring to FIGS. 6 and 7 the receptacle 136 includes a protective cover 142. The protective cover 142 comprises an outer shell 144 made of a plastics material such as rigid PVC, and a heat transfer plate 146 made of a metallic, magnetic material such as magnetised stainless steel, a contact assembly 148 and a heat source comprising first 160a and second 160b heating elements.

The heat transfer plate 146 comprises three locating openings 147 which cooperate with three corresponding locating projections 149 on the measurement probe's 20 contact face 47 as explained in more detail below.

The contact assembly 148 comprises a plurality of electrical contacts 154 which are electrically connected to the control system 127 via wires 156. The electrical contacts 154 and wires 156 are mounted on a flexible support arm 158 so that the electrical contacts 154 have some degree of freedom relative to the outer shell 144. The electrical contacts 154 are configured to contact corresponding electrical contacts 155 on a measurement probe 20 received in the receptacle 136. In one preferred embodiment, power is supplied to electrical components (not shown) contained in the measurement probe 20 via the electrical contacts 154 and 155. This enables the electrical components in the measurement probe 20 to be kept in ready mode, ready for use by a CMM 2. Optionally, the electrical contacts 154 and 155 can be used to transfer data to and/or from the measurement probe 20. For instance, the measurement probe 20 could include a temperature sensor 180 and the electrical contacts 154 and 155 could be used to transfer data from the temperature sensor to the control unit 127. In another preferred embodiment, the electrical contacts 154 and 155 are used to supply power to a heat source 190 in the measurement probe 20 in order to maintain the temperature of the measurement probe 20 at its operating temperature.

The first 160a and second 160b heating elements are resistors which are electrically connected to the control unit 127 via wires 152. The wires 152 for the heating element are mounted on the flexible support arm 158. As will be understood, the preferred resistance of each of the resistors will depend on many factors such as the application in which the apparatus is used, and the required temperatures the apparatus is to work with. The first 160a and second 160b heating elements are mounted on the heat transfer plate 146. Accordingly, in use the heating elements directly heat the measurement probe 20 received in the receptacle 136. The heat transfer plate 146 also warms due to the heat from the first 160a and second 160b heating elements and this helps to uniformly heat the measurement probe 120 received in the receptacle over its entire area rather than just at specific points.

The measuring probe 20 has magnets (not shown) located towards its contact face 47 such that when the measuring probe 20 is received in the receptacle 136, the measuring probe 20 is urged towards the heat transfer plate 146 in the direction shown by arrow B. The measuring probe 20 is shown spaced apart from the heat transfer plate 146, but in use the measuring probe 20 will be magnetically attracted towards the protective cover 142 so that the locating projections 149 will be received in the locating openings 147 on the heat transfer plate 146. This ensures that the electrical connectors 154, 155 on the heat transfer plate 146 and measuring probe 20 are co-located. The locating openings 147 and the locating projections 149 are configured such that when the locating projections 149 are received in the locating openings 147, the contact face 47 of the measuring probe 20 is spaced a small distance away from the heat transfer plate 146.

The protective cover 42 is mounted so that it can slide, along rails (not shown), into the receptacle housing 134 in the direction illustrated by arrow A. A spring 143 is fastened to the protective cover 142 and to the receptacle housing 134 such that the spring 143 biases the protective cover 142 towards the closed position. The flexible arm 158 on which the wires 152, 156 for the heating elements 160a, 160b and the electrical contacts 154 are mounted is configured to roll along its length as the protective cover 142 is retracted into the receptacle housing 134. This helps to prevent the flexible arm 158 from breaking and also from jamming the protective cover 142 within the receptacle housing 134.

As will be understood, the rack 32 described in connection with FIGS. 2 to 4 could be configured in line with that described in connection with FIGS. 5 to 7 so as to provide electrical contacts which can contact corresponding electrical contacts on a device stored in the receptacles.

Figure 8:
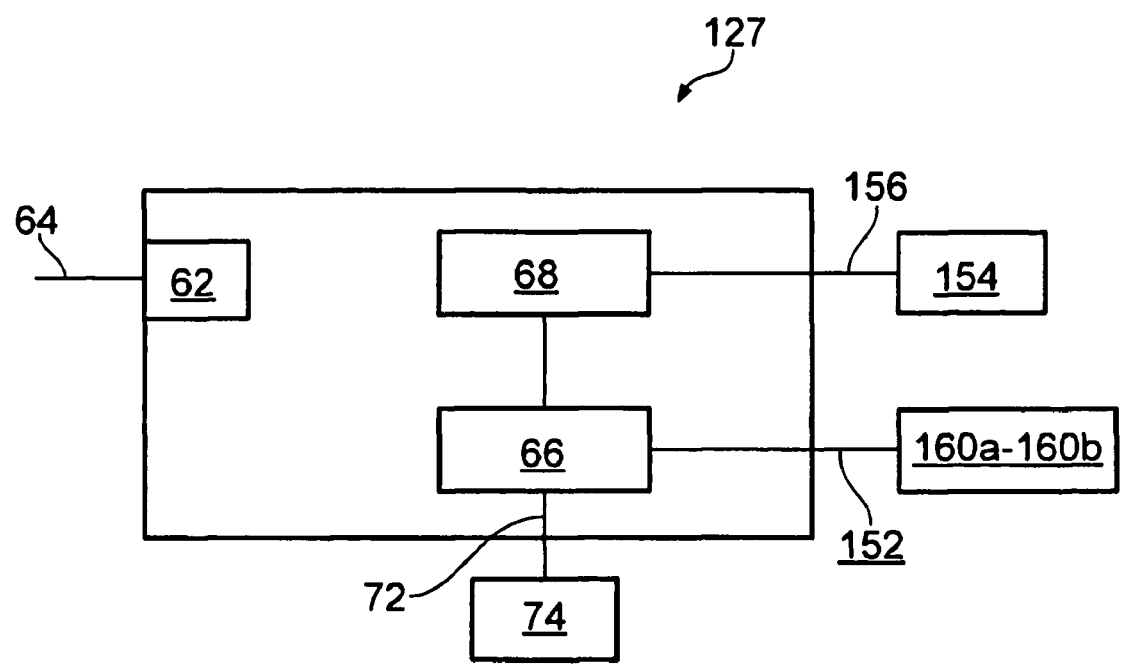
FIG. 8 is a schematic illustration of the temperature control device of the storage apparatus shown in FIGS. 5 to 7.

Referring to FIG. 8, a control unit 127 for a storage apparatus 104 according to FIGS. 5 to 7 is illustrated. The control unit 127 comprises a power supply unit (PSU) 62 which receives power from a mains supply 64, a temperature controller 66, and a probe power switcher 68.

The temperature controller 66 is configured to output power to a heat source such as first 160a and second 160b heating elements on the output line 152 in order to heat the heating elements. The temperature controller 66 can receive a signal from an input device 72 on input line 74 which can be used by the temperature controller 66 to determine how much power to output along output line 52 to the heat source. In one preferred embodiment the input device 74 is a switch which can be operated by a user to select how much power to output. In another preferred embodiment, the input device 74 is a temperature sensor mounted on the receptacle 136 which indicates the operating temperature of the measurement probe 20 received in the receptacle 136. Accordingly, in these cases, the temperature controller 66 is configured to determine how much power to provide to the heat source in order to maintain the temperature of the measurement probe 20 based on the input from the input device 74. In a further embodiment, the temperature controller 66 can receive a signal indicative of the operating temperature of a measurement probe 20 from a temperature sensor 180 located in the measurement probe via the probe power switch 68 which can receive data from the measurement probe along line 156.

The probe power switcher 68 is connected to the electrical connectors 154 via the wires 156 and is configured to determine when the electrical connectors 154 are in contact with connectors 155 on the measurement probe 20. The probe power switcher 68 is also configured to supply power to the measurement probe 20 via the electrical connectors 154 in order to keep the electrical components in the measurement probe 20 in a ready mode.

The controller device 27 for a storage apparatus 4 as illustrated in FIGS. 2 to 4 will be similar to that shown in FIG. 6. Also, as will be understood, the temperature controller 66 will be connected to respective heat sources and electrical connectors in each of the receptacles 36a, 36b, 36c, and will be able to control each heat source and each set electrical connectors independently from each other.

In use, a measuring probe 20 that is loaded on a head 10 is stored in a receptacle, for example the receptacle 136 illustrated in FIGS. 5 to 7, by moving the measuring probe 20 into the receptacle in the direction indicated by arrow A (see FIG. 5) such that the grooves in the measuring probe 20 engage the ribs 138, 140 in the receptacle. In doing so the head 10 pushes the protective cover 142 into the receptacle housing 134. The head 10 and measuring probe 20 are held together via corresponding magnets (not shown). Accordingly, in order to disengage the head 10 from the measuring probe 20, the CMM 2 moves the head 10 vertically in order to pull the head 10 away from the measuring probe 20 so as to disengage the magnets. The head 10 is then moved away from the receptacle 136 so that the protective cover 142 moves back into its closed position under the bias of the spring 143. The magnets (not shown) in the measuring probe 20 are attracted to the magnetic heat transfer plate 142 and so the measuring probe 20 is pulled upwards into contact with the heat transfer plate 142, thereby making electrical contact between the electrical connectors 154 on the contact assembly 148 and the electrical connectors 155 on the measurement probe 20 as described above.

The probe power switcher 68 detects the establishment of the contact between the corresponding electrical connectors 154, 155 and provides power to the electrical components within the measurement probe 20. Meanwhile, the temperature controller 66 supplies power to the first 160a and second 160b heating elements in order to heat the measurement probe 20, thereby maintaining measurement probe 20 at a predetermined temperature.

When the measurement probe 20 is to be loaded onto a head 10 for use in a CMM 2, the head 10 is moved into the protective cover 142 so as to slide the protective cover 142 into the receptacle housing 134. In doing so, this displaces the electrical connectors 154 on the contact assembly 148 thereby disconnecting them from the electrical connectors on the measurement probe 20. According this breaks the electrical contact between the electrical connectors 154 on the contact assembly 148 and the electrical connectors on the measurement probe 20. This action also disengages the magnets on the measurement probe 20 from the magnetic heat transfer plate 146. The measurement probe 20 is then held in the receptacle by the engagement between the receptacle's ribs 138 and 140 and the corresponding grooves on the measurement probe 20. Once the head's 10 magnets and the corresponding magnets on the measurement probe 20 are aligned, the head 10 picks up the measurement probe 20 and slides the measurement probe 20 out of the receptacle.

As the measurement probe 20 has been kept at its operating temperature by the storage apparatus 104, it is not necessary to wait for the measurement probe 20 to warm up to its operating temperature. Accordingly, the measurement probe 20 can be used in a measuring operation immediately.

As will be understood, the heating and temperature maintenance aspects and features of the embodiments described are optional and are not essential or necessary features of the present invention.

The invention claimed is:

1. A storage apparatus for a measurement probe for use with a coordinate positioning machine, comprising:
    at least one receptacle for a measurement probe;
    at least one receptacle connector for electrical connection with at least one probe connector on a measurement probe when a measurement probe is located in the receptacle,
    in which the at least one receptacle connector is configured such that it can be displaced so as to disconnect it from the probe connector of a measurement probe when a measurement probe is located in the receptacle.

2. A storage apparatus as claimed in claim 1, comprising a displacement member operable by a coordinate positioning machine so as to displace the at least one receptacle connector.

3. A storage apparatus as claimed in claim 2, in which the displacement member comprises an arm on which the at least one receptacle connector is carried.

4. A storage apparatus as claimed in claim 3, in which at least a part of the arm extends from the storage unit for manipulation by a coordinate positioning machine.

5. A storage apparatus as claimed in claim 3, configured such that the arm extends across the receptacle such that when a measurement probe is to located in the receptacle the arm extends over at least a part of the face of a measurement probe which is for mounting to a coordinate positioning machine.

6. A storage apparatus as claimed in claim 3, in which the at least one receptacle connector is mounted on the arm via a flexible mount such that the at least one electrical connector can move relative to the at least one arm.

7. A storage apparatus as claimed in claim 3, in which the at least one arm is configured to be biased against a measurement probe located in the receptacle.

8. A storage apparatus as claimed in claim 7, in which the at least one arm has at least one magnet for attracting a measurement probe located in the receptacle.

9. A storage apparatus as claimed in claim 3, in which the at least one arm comprises at least one location feature for cooperation with a corresponding feature on a measurement probe located in the receptacle.

10. A storage apparatus as claimed in claim 1, in which the at least one receptacle connector is for supplying electric power to any electrical components in a measurement probe received in the receptacle.

11. A storage apparatus as claimed in claim 1, comprising at least two receptacles, at least two of which have at least one receptacle connector which can be displaced so as to disconnect it from the probe connector of a measurement probe located in the receptacle.

12. A kit comprising:
    a storage apparatus having a receptacle for a measurement probe and at least one receptacle connector;
    a measurement probe for use on a coordinate positioning machine, the measurement probe having a contact face providing at least one machine connector for electrical connection to a corresponding connector on a coordinate positioning machine when mounted on a coordinate positioning machine;
    in which the storage apparatus is configured such that the at least one receptacle connector is configured to electrically connect to an electrical connector on the measurement probe's contact face when the measurement probe is located in the receptacle.

13. A kit as claimed in claim 12, in which the at least one receptacle connector electrically connects with contact face's at least one machine connector.

14. A method of storing a measurement probe mounted on a coordinate positioning machine in a storage apparatus, the measurement probe comprising electrical components that are electrically connected to the coordinate position machine via at least one machine connector provided on a contact face of the measurement probe, the storage apparatus comprising at least one receptacle and at least one receptacle connector, the method comprising in any suitable order:

locating the measurement probe in the receptacle; and electrically connecting the at least one receptacle connector to the electrical components in the measurement probe via an electrical connector on the measurement probe's contact face.

15. A method as claimed in claim 14, in which the method comprises electrically connecting the at least one receptacle connector to the electrical components in the measurement probe via the measurement probe's machine connector.

* * * * *